(12) United States Patent
Dobson et al.

(10) Patent No.: US 12,124,632 B2
(45) Date of Patent: Oct. 22, 2024

(54) SYSTEMS AND METHODS FOR CUSTOMIZING A HAPTIC OUTPUT OF A HAPTIC ACTUATOR OF A USER DEVICE

(71) Applicant: Google LLC, Mountain View, CA (US)

(72) Inventors: Kelly Elizabeth Dobson, Mountain View, CA (US); Franziska Schlagenhauf, Ludwigsburg (DE); William Earl Singhose, Atlanta, GA (US); Khalid Lief Sorensen, College Place, WA (US); Nina R. Sinatra, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/260,174

(22) PCT Filed: Dec. 30, 2020

(86) PCT No.: PCT/US2020/067468
§ 371 (c)(1),
(2) Date: Jun. 30, 2023

(87) PCT Pub. No.: WO2022/146426
PCT Pub. Date: Jul. 7, 2022

(65) Prior Publication Data
US 2024/0069639 A1 Feb. 29, 2024

(51) Int. Cl.
*G06F 3/01* (2006.01)
*G06F 3/0488* (2022.01)

(52) U.S. Cl.
CPC .............. *G06F 3/016* (2013.01); *G06F 3/015* (2013.01); *G06F 3/0488* (2013.01)

(58) Field of Classification Search
CPC ....................................................... G06F 3/016
See application file for complete search history.

(56) References Cited

U.S. PATENT DOCUMENTS

2010/0173276 A1* 7/2010 Vasin ................. A63B 24/0006
434/323
2020/0333884 A1 10/2020 Ruffner et al.
(Continued)

OTHER PUBLICATIONS

International Preliminary Report on Patentability for Application No. PCT/US2020/067468, mailed Jul. 13, 2023, 10 pages.
(Continued)

*Primary Examiner* — Gustavo Polo
(74) *Attorney, Agent, or Firm* — DORITY & MANNING P.A.

(57) ABSTRACT

A haptic system can include a user device including one or more haptic actuators and one or more sensors. The haptic system can be configured to perform operations including controlling the haptic actuator(s) to produce a haptic output based on a haptic output profile associated with a desired action of a user of the haptic system; detecting, using the one or more sensors, one or more user response characteristics in response to the haptic output; determining, based at least in part on the one or more user response characteristics, data describing a user action of the user performed after the haptic actuator(s) produces the haptic output; comparing the data describing the user action with data indicative of the desired action to generate an effectiveness metric; and determining a subsequent haptic output profile for a subsequent haptic output based at least in part on the effectiveness metric.

27 Claims, 7 Drawing Sheets

(56) References Cited

U.S. PATENT DOCUMENTS

2020/0387225 A1    12/2020  Das et al.
2022/0287909 A1*  9/2022  Sanchez Solana .... G16H 20/60

OTHER PUBLICATIONS

Alahakone et al., "A Real Time Vibrotactile Biofeedback System for Improving Lower Extremity Kinematic Motion during Sports Training", 2009 International Conference of Soft Computing and Pattern Recognition, 2009, pp. 610-615.
International Search Report for PCT/US2020/067468, Mailed on Oct. 4, 2021, 6 pages.

* cited by examiner

SYSTEMS AND METHODS FOR CUSTOMIZING A HAPTIC OUTPUT OF A HAPTIC ACTUATOR OF A USER DEVICE

PRIORITY CLAIM

The present application is based upon and claims the right of priority under 35 U.S.C. § 371 to International Application No. PCT/US2020/067468 filed on Dec. 30, 2020, which is incorporated by reference herein.

FIELD

The present disclosure relates generally to haptic actuators and control thereof.

BACKGROUND

Many computing devices include haptic actuators configured to provide a user with physical sensation through a haptic vibration, click, or the like. Such haptic output can serve to alert users about the state of the computing devices or otherwise convey information to the users. However, conventional haptic outputs are generally generically configured.

SUMMARY

Aspects and advantages of embodiments of the present disclosure will be set forth in part in the following description, or may be learned from the description, or may be learned through practice of the embodiments.

One example aspect of the present disclosure is directed to a haptic system including a user device comprising one or more haptic actuators and one or more sensors, one or more processors, and one or more memory devices, the one or more memory devices storing computer-readable instructions that when executed by the one or more processors cause the one or more processors to perform operations. The operations include controlling the one or more haptic actuators to produce a haptic output based on a haptic output profile associated with a desired action of a user of the haptic system; detecting, using the one or more sensors, one or more user response characteristics in response to the haptic output; determining, based at least in part on the one or more user response characteristics, data describing a user action of the user performed after the one or more haptic actuators produces the haptic output; comparing the data describing the user action with data indicative of the desired action to generate an effectiveness metric; and determining a subsequent haptic output profile for a subsequent haptic output based at least in part on the effectiveness metric.

Another example aspect of the present disclosure is directed to a method for customizing a haptic output of a user device. The method can include controlling, by one or more computing devices, one or more haptic actuators of a user device to produce a haptic output based on a haptic output profile associated with a desired action of a user of the user device; detecting, by one or more computing devices and using the one or more sensors, one or more user response characteristics in response to the haptic output; determining, by one or more computing devices and based at least in part on the one or more user response characteristics, data describing a user action of the user performed after the one or more haptic actuators produces the haptic output; comparing, by one or more computing devices, the data describing the user action with data indicative of the desired action to generate an effectiveness metric; and determining, by one or more computing devices, a subsequent haptic output profile for a subsequent haptic output based at least in part on the effectiveness metric.

Another example aspect of the present disclosure is directed to a method for customizing a haptic output. The method includes, for a plurality of iterations, controlling, by one or more computing devices, a first haptic actuator of a first user device to produce a haptic output at the first user device based on a haptic output profile; determining, by the one or more computing devices, an effectiveness of the haptic output of the first haptic actuator at inducing a desired user action by a user of the first user device based on detecting signals from one or more sensors of the first user device; and adjusting, by the one or more computing devices, the haptic output profile to improve the effectiveness of the haptic output of the first haptic actuator at inducing the desired user action by the user of the first user device. The method includes, after the plurality of iterations, determining, by the one or more computing devices, a second haptic output profile for a second haptic actuator of a second user device based on adjusting the haptic output profile for the first user device during the plurality of iterations.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods for customizing a haptic output of a haptic actuator of a user device. The haptic output can be customized in a manner that increases or optimizes the effectiveness of the haptic output at inducing the user to perform particular actions such as particular user movements. Example particular actions can include getting out of bed, going for a walk or run, standing, stretching, etc. The system can iteratively optimize a haptic output signature based on a measured effectiveness of the haptic output. The system can administer the haptic output, detect an effectiveness of the haptic output, and adjust a haptic output profile of the haptic output, until the haptic output effectively induces the desired user action.

For example, according to aspects of the present disclosure, a haptic system can include a user device including a haptic actuator and one or more sensors. Example types of haptic actuators include linear resonant actuators (LRA) and eccentric rotating mass (ERM) actuators. The sensor(s) can include, for example, a variety of ambient, kinematic and biometric sensor types, such as accelerometers, temperature sensors, heart rate sensors, galvanic skin response sensors, or other sensors. The haptic system can include one or more processors configured to control the haptic actuator to produce a haptic output based on a haptic output profile associated with a desired action of a user of the haptic system. The haptic system can be configured to detect, using the sensor(s), one or more user response characteristics in response to the haptic output. For example, an accelerometer can detect movement of the user. As another example, a heart rate sensor can detect an increase in the user's heart rate. The haptic system can determine, based at least in part on the user response characteristic(s), data describing a user action, such as movement performed by the user after the haptic actuator produces the haptic output. For example, the haptic system can determine that the user has gotten out of bed, started walking and/or running, sat down or otherwise moved based on the accelerometer data and/or heart rate sensor data. The haptic system can compare the data describing the user action with the desired action to generate an effectiveness metric. The effectiveness metric can describe how effective the haptic output was at inducing the particular desired action. As examples, the effectiveness metric can quantify a similarity between the performed user action and the desired action, how long it takes for the user to perform the user action after the haptic output is produced, and/or how many times the haptic output is produced before the user performs the user action.

In some embodiments, multiple iterations can be performed including the steps described above in which the haptic output is iteratively adjusted to improve its effectiveness. For example, the haptic system can be configured to control the haptic actuator to produce a subsequent haptic output according to the subsequent haptic output profile, detect, using the sensor(s), data describing a subsequent user action performed after the haptic actuator produces the subsequent haptic output, compare the data describing the subsequent user action with the desired action to generate a subsequent effectiveness metric, and adjust the subsequent haptic output profile based on the effectiveness metric and the subsequent effective metric.

The haptic system can be configured to repeat iterations including some or all of the steps described above until one or more criteria are satisfied. For example, the haptic output profile can be iteratively adjusted until the effectiveness metric satisfies one or more predetermined criteria. As examples, the effectiveness metric can include or describe target time intervals or target numbers of haptic output events required to elicit the desired user action, for example as described below. The effectiveness metric can include or describe other criteria. In some embodiments, the effectiveness metric may include or describe feedback data received by the user regarding the haptic output. For example, the user may indicate that the haptic output is too intrusive, alarming, repetitive, or otherwise undesirable. The predetermined criteria can be defined with respect to the various aspects of the effectiveness metric. For instance, the predetermined criteria can be or include a maximum time bound for a time interval range or the like.

The haptic system can detect the user response characteristic(s) using a variety of sensors. Example sensors can include accelerometers, skin temperature sensors, heart rate sensors, touch sensitive items (e.g., display screens, track pads, etc.), blood pressure sensors, ambient light sensors, position sensors (e.g., global positioning sensors), and the like. In some embodiments, the user characteristic(s) detected by the haptic system can include one or more physiological response characteristics of the user. Example physiological response characteristics can include heart rate, skin temperature, skin galvanic response, blood pressure, and the like.

The haptic system can determine information about a user action performed by the user based on the user response characteristics. For example, the haptic system can determine that the user is walking, running, standing, sitting, laying down, or sleeping. Additional examples can include cooking, reading, writing, typing, and other common movements and actions.

In some embodiments, the haptic system can collect information from multiple distinct sensors and/or sensor types and use this information when determining what user action is being performed. For example, the haptic system can detect a first user response characteristic(s) using a first sensor and detect a second user response characteristic (e.g., movement) of the user using a second sensor. For instance, the haptic system can detect user characteristics including an increased heart rate and/or increased skin temperature of the user using a heart rate sensor and/or a skin temperature sensor. The haptic system can detect movement from the accelerometer that corresponds with jogging or running. The haptic system can determine that the user is running based on this combination of information. Thus, in some embodiments, the haptic system can determine or identify the user action based on signals received from multiple distinct sensors and/or sensor types.

In some embodiments, the haptic system can detect the user response characteristic(s) based at least in part from the user interacting with a touch-sensitive display screen of the device. For instance, the user can perform a particular action with the user device. The haptic system can determine data describing this action including how long it took for the user to perform the action, how many haptic events were produced to induce the user to act and so forth.

The desired action for the user can include a variety of actions. Examples include getting out of bed, turning on the light, taking a shower, starting to prepare dinner, taking a particular medicine, standing up to stretch, going to a particular destination (e.g., work, grocery store, home, etc.), going to bed, reading a book, and turning out the light. Additional examples can include starting an exercise, stopping an exercise, going for a run or walk, adjusting a tempo and/or pace of an exercise. Further example actions include interacting with the user device to perform an action such as setting an alarm, sending a text message, initiating a phone call, answering a phone call, starting to use a particular application, stopping using a particular application, and/or performing a particular action with a particular application. In some embodiments, the desired action can include an unconscious or involuntary act such as falling asleep and adjusting a breathing pattern or rate.

In some embodiments, a haptic output produced by the haptic actuator may not induce the user to take any action or to take an action that is suitably similar to the desired action. As one example, the user action could include getting out of bed. If the user does not get out of bed after the haptic output is produced, the haptic system could repeat the haptic output until the user gets out of bed. For example, before detecting the data describing the user action by the user using the sensor(s) and after controlling the haptic actuator to produce the first haptic output based on the haptic output profile associated with the desired action, the haptic system can control the haptic actuator to produce at least one subsequent haptic output.

The haptic system can determine how many subsequent/repeated haptic output(s) were required to induce the user to perform the desired action or a similar action. The data describing the user action can include or describe the number of subsequent haptic output(s) before the user performed the action. The effectiveness metric can also include or describe the number of subsequent haptic output (s). For example, a haptic output that required no subsequent/repeated haptic output events may result in an effectiveness metric indicative of greater effectiveness than a different haptic output that was repeated once or more before the user acted. Comparing the data describing the user action with the desired action to generate the effectiveness metric can include comparing the number of the subsequent haptic output(s) with a target number of haptic outputs, such as two haptic outputs or fewer. Thus, the haptic system can iteratively adjust the haptic output profile to improve the effectiveness of haptic output at inducing the desired action with fewer repeated haptic output events.

Similarly, according to aspects of the present disclosure, the haptic system can iteratively adjust the haptic output profile to improve the effectiveness of a haptic output at more quickly inducing the desired action. For example, the haptic system can determine a time interval between controlling the haptic actuator to produce the first haptic output (if more than one haptic output is produced) and detecting that the user has performed the user action (e.g., to detect the data describing the user action using the sensor(s) of the user device). This time interval can be indicative of how effective the haptic output is at inducing the user action. Comparing the data describing the user action with data describing the desired action to generate the effectiveness metric can include comparing the time interval with a target time interval. The target time interval can include a maximum time bound. For instance, the maximum time bound can be two seconds, three seconds, or more. In this example, the haptic system can iteratively adjust the haptic output profile to reduce the time interval below the maximum time bound.

In some embodiments, the target time interval can include a minimum time bound in addition to the maximum time bound. The minimum time bound can prevent the haptic system from adjusting the haptic output to where it is too urgent or annoying to the user. As one example, a target time interval for inducing a user to get out of bed can have a minimum time bound of 30 seconds, 60 seconds, 120 seconds or longer, such that the haptic system does not iteratively arrive at a haptic output profile that is too alarming or urgent for the target user action. In addition, in some embodiments, the target time interval could include both a minimum time bound or a maximum time bound.

In some embodiments, the haptic system can include one or more machine-learned models configured to perform or assist with one or more of the determinations and/or steps described herein. The machine-learned models described herein can be or can otherwise include one or more various model(s) such as, for example, decision tree-based models (e.g., random forest models such as boosted random forest classifiers), neural networks (e.g., deep neural networks), or other multi-layer non-linear models. Neural networks can include recurrent neural networks (e.g., long short-term memory recurrent neural networks), feed-forward neural networks, convolutional neural networks, and/or other forms of neural networks.

As one example, the haptic system can include a machine-learned model configured to generate data describing subsequent haptic output profile(s). The machine-learned model can receive, as input(s), data describing the user action, the effectiveness metric, and/or the haptic output profile. The machine-learned model can be configured to output data describing the subsequent haptic output profile for the subsequent haptic output. The machine-learned model can be trained to generate subsequent haptic output profiles to improve the effectiveness metric. Thus, in some embodiments, the haptic system can leverage a machine-learned model to iteratively adjust the haptic output profile to improve the effectiveness of the haptic output.

As another example, the haptic system can include a machine-learned model configured to generate the effectiveness metric. The machine-learned model can be configured to receive data describing the user action and/or data describing a comparison of the user action with the desired user action. In response to receiving the data describing the user action and/or comparison with the desired user action, the machine-learned model can output data describing the effectiveness metric. Comparing the data describing the user action with the desired action to generate the effectiveness metric can include inputting the data describing the user action and/or comparison with the desired action into the machine-learned model and receiving data describing the effectiveness metric as an output of the machine-learned model.

As another example, the haptic system can include a machine-learned model configured to determine a user action that is being performed by the user. The machine-learned model can be configured to receive sensory data from one or more sensors. In response to receiving the sensory data, the machine-learned model can generate an output that describes a predicted user action.

Additional aspects of the present disclosure are directed to transferring or mapping a haptic output profile that has been customized on a user's first device from the user's first device to a second device of the user. In some embodiments, the first device and second device can be shared by a group of users (e.g., a couple, a family, friends, or the like). For example, first, a haptic output profile can be iteratively adjusted on the first device such as a smartwatch to increase or maximize the effectiveness of the haptic output to remind or cause the user to perform a particular action, such as checking on an item that is cooking in the stove within 1 min of the haptic output being produced. This haptic output profile can be mapped or transferred to a second device such as a smartphone (e.g., of the same user). Aspects of the haptic output profile may be adjusted when being mapped or transferred from the first device to the second device based on a variety of factors. One example factor can include how the device is usually held, carried, worn, etc. For instance, smartphones are generally held in a pocket or handbag of the user instead of worn by the user, like a smartwatch. Another example factor can include physical properties (e.g., size, weight, etc.) of the devices and/or response characteristics of the actuators of the devices. For instance, a smartphone may have a smaller, less powerful actuator than a smartwatch. Smartphones may be larger than smartwatches and require larger haptic output at the actuator to create the same movement, force, vibration, etc. of the device and thus produce the same effect or a similar effect for the user. Conversely, the haptic output of a smartwatch may need to be larger because fingertips (when holding a phone in hand) are much more sensitive to vibration than the wrist (smartwatch). Thus, mapping or transferring customized haptic output profiles between devices can include adjusting the haptic output profiles to account for differences between the devices. In some embodiments, mapping or transferring customized haptic output profiles between devices can include adjusting the haptic output profiles to account for differences between how the users' use their devices and/or differences between user preferences. For example, a first user may carry their phone in their pocket, but a second user may prefer to carry their phone in a bag, such as a handbag or backpack. The haptic output profile can be adjusted based on such differences when being mapped or transferred to a new device. As another example, the haptic profile can be adjusted based on a difference between how two different devices are used by the same user. For instance, the user may tend to carry their tablet in their handbag, but carry their phone in their pocket. In this instance, if a haptic profile is being mapped from the user's phone to the user's tablet, the haptic output profile can be adjusted. For example, a magnitude, duration, or another parameter of the haptic output profile can be reduced to account for the difference in how the device(s) are used. Thus, the haptic profile can be mapped or transferred based on how the device(s) are used.

In some embodiments, a method for customizing a haptic output can include performing a plurality of iterations including operations to customize the haptic output at the first device. The operations can include controlling a first haptic actuator of a first user device to produce a haptic output at the first device based on a haptic output profile. The operations can include determining an effectiveness metric of the haptic output of the first haptic actuator at inducing a desired user action by a user of the first user device. This determination can be made based on detecting signals from one or more sensors of the first user device. The operations can include adjusting the haptic output profile to improve the effectiveness of the haptic output of the first haptic actuator at inducing the desired user action by the user of the first user device. Next, after the plurality of iterations, the method can include determining a second haptic output profile for a second haptic actuator of a second user device. The second haptic output profile can be determined based on adjustments to the haptic output profile for the first user device during the plurality of iterations. For example, the second haptic output profile can be determined by mapping a haptic output for the first user device that has been suitably customized to produce the desired user action with desired parameters. For instance, the effectiveness of the haptic output profile can satisfy a predetermined satisfaction criteria threshold, such as inducing the desired user action within the time interval and/or explicitly being approved by the user for transfer between devices.

Figure 1A:
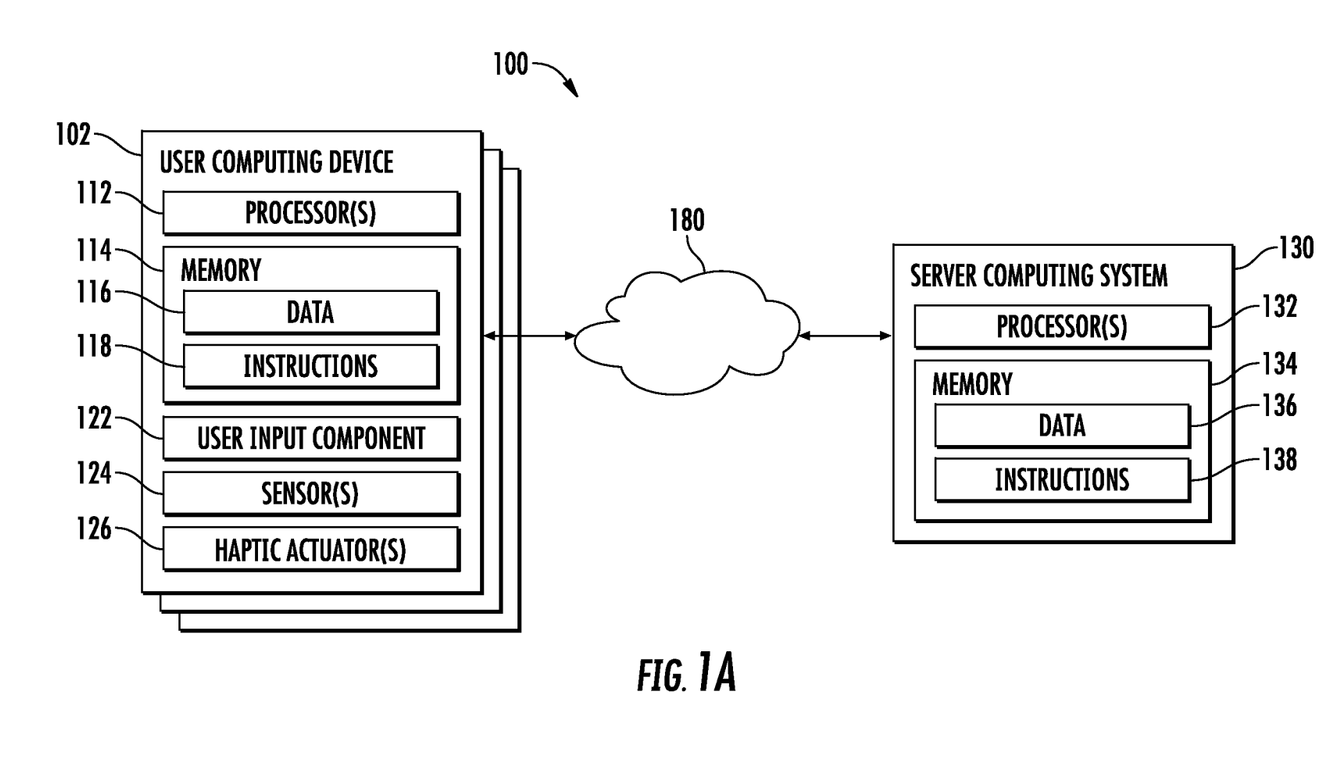
FIG. 1A illustrates an example of a computing environment in accordance with example embodiments of the present disclosure.

FIG. 1A depicts a block diagram of an example haptic system 100 for customizing a haptic output of a haptic actuator of a user device according to example embodiments of the present disclosure. The system 100 can include a user computing device 102 and a server computing system 130 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations. Electronic items and/or data describing electronic items can be stored in one more local memory locations of the user computing device 102. For example, the local memory location can correspond with the memory 114.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication. The user computing device 102 can also include one or more sensors 124, such as accelerometers, temperature sensors, heart rate sensors, microphones, cameras, ambient light sensors, touch sensitive items (e.g., display screens, track pads, etc.), blood pressure sensors, and the like.

The haptic system 100 can be configured to detect, using the sensor(s), 124 one or more user response characteristics in response to the haptic output. For example, an accelerometer can detect movement of the user. As another example, a heart rate sensor can detect an increase in the user's heart rate.

The user computing device 102 can include one or more haptic actuators 126. Example types of haptic actuators 126 include linear resonant actuators (LRA), eccentric rotating mass (ERM) actuators, and other actuators that provide a haptic output or response.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Figure 1B:
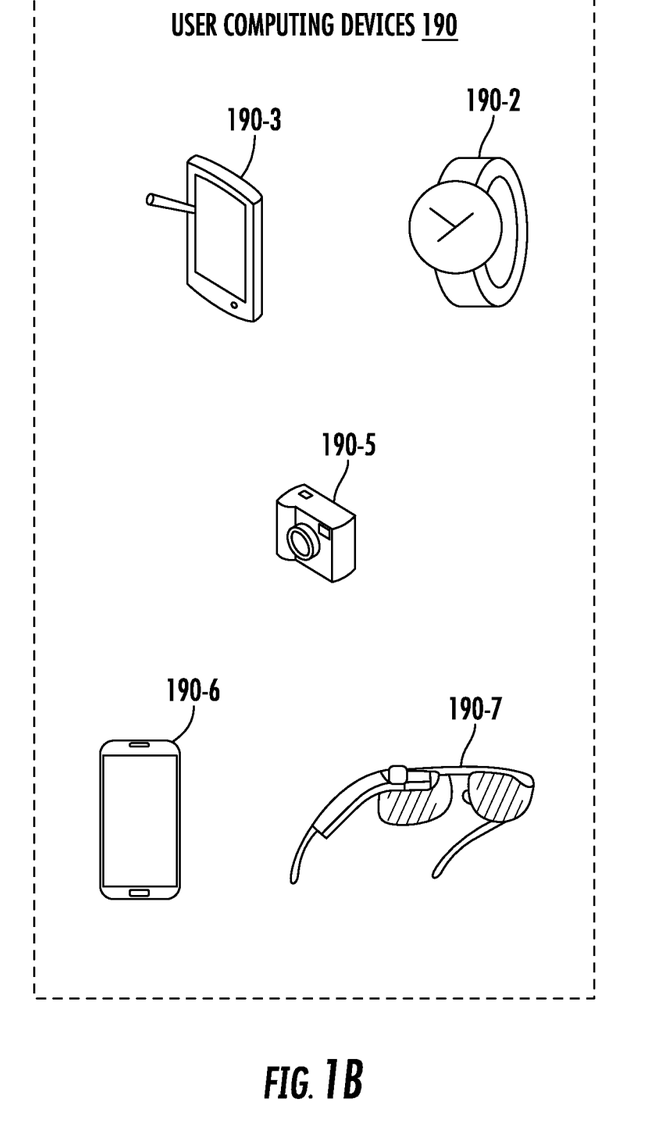
FIG. 1B illustrates example user computing devices in accordance with example embodiments of the present disclosure.

FIG. 1B illustrates example computing devices that can include a haptic system according to aspects of the present disclosure. Computing devices 190 are illustrated with various non-limiting example devices: smartwatch 190-2, tablet 190-3, camera 190-5, smartphone 190-6, and computing spectacles 190-7, though other devices may also be used, such as home automation and control systems, sound or entertainment systems, home appliances, security systems, netbooks, and e-readers. Note that computing device 190 can be wearable (e.g., computing spectacles and smartwatches), non-wearable but mobile (e.g., laptops and tablets), or relatively immobile (e.g., desktops and servers).

Figure 2A:
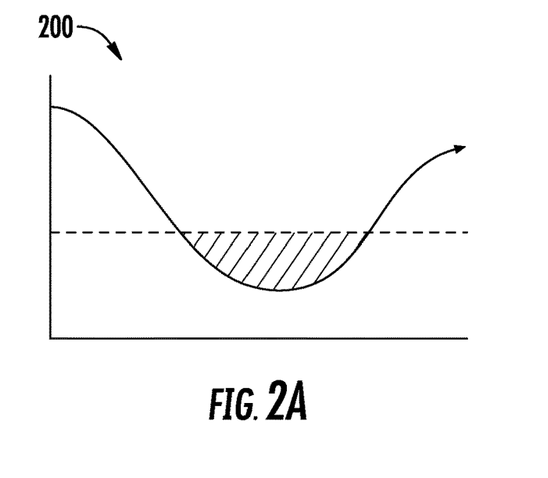
FIGS. 2A through 2F illustrate a series of sequential views of a user, a user device, and a haptic output profile according to aspects of the present disclosure.
Figure 2B:
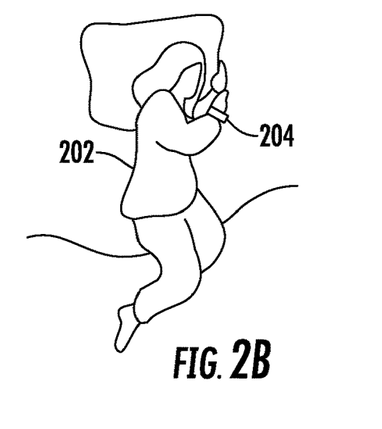

FIGS. 2A through 2F are a series of illustrations of a particular example according to aspects of the present disclosure. FIG. 2A illustrates a simplified example haptic output profile 200 of a haptic output for a haptic actuator of a user device 102. The haptic profile 200 can be customized according to aspects of the present disclosure. The haptic profile 200 can be customized in a manner that increases or optimizes the effectiveness of the haptic output at inducing a user 202 to perform particular actions such as particular user movements. In this example, the user 202 is wearing a user computing device 204, such as a smartwatch, while sleeping. Example particular actions can include getting out of bed, going for a walk or run, standing, stretching, etc. The system can iteratively optimize the haptic profile 200 based on a measured effectiveness of the haptic output at inducing the action. The system can administer the haptic output, detect an effectiveness of the haptic output, and adjust the haptic profile 200 of the haptic output 200, until the haptic output effectively induces the desired action by the user 202.

Figure 2C:
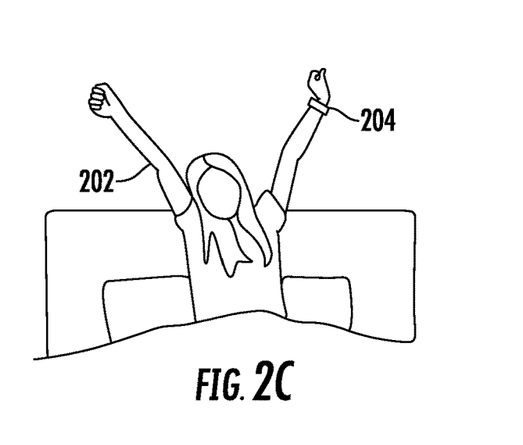
Figure 2D:
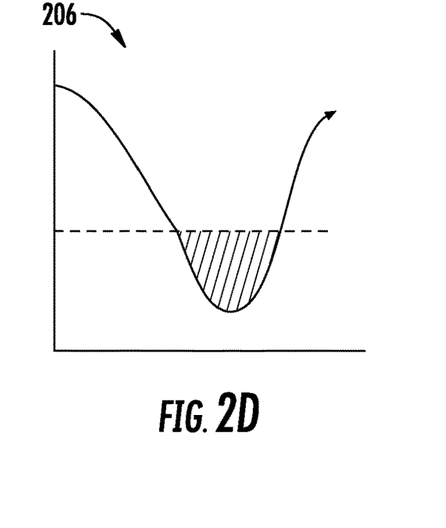
Figure 2E:
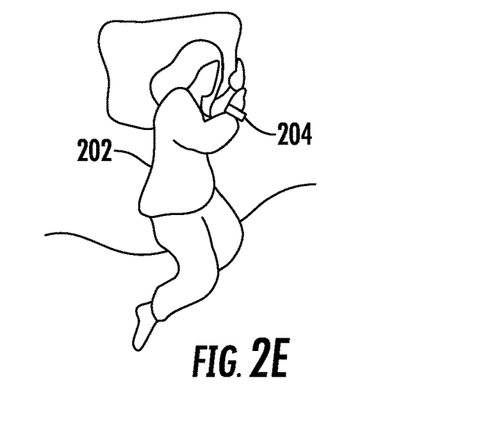

Referring to FIG. 2C, the user 202 can perform an action in response to the haptic output. In this example, the action can include waking up, sitting up, getting out of bed, or the like. Additional examples can include cooking, reading, writing, typing, and other common movements and actions. The haptic system can determine, based at least in part on the user response characteristic(s), data describing the user action or movement, of the user performed after the haptic actuator produces the haptic output. As additional examples, the haptic system can determine that the user 202 has started walking, running, sat down or otherwise moved based on the sensor data (e.g., accelerometer data and/or heart rate sensor data) detected by the sensor(s) 124.

The haptic system can compare the data describing the user action with the desired action to generate an effectiveness metric. The effectiveness metric can describe how effective the haptic output was at inducing the particular desired action. As examples, the effectiveness metric can quantify a similarity between the performed user action (FIG. 2C) and the desired action, how long it takes for the user to perform the user action after the haptic output is produced, and/or how many times the haptic output is produced before the user performs the user action. The haptic system can produce a subsequent haptic profile 206 for a subsequent haptic output.

In some embodiments, multiple iterations can be performed including the steps described above in which the haptic output is iteratively adjusted to improve its effectiveness. For example, referring to FIG. 2E, the haptic system can control the haptic actuator to produce a subsequent haptic output according to the subsequent haptic output profile. In some embodiments, the haptic system can produce the subsequent haptic output when the user 202 in a similar environment or situation as the previous time that the haptic output was produced. In this example, the haptic output can be produced when the user 202 is sleeping (e.g., at a time that the user has set to wake up and/or get out of bed).

Figure 2F:
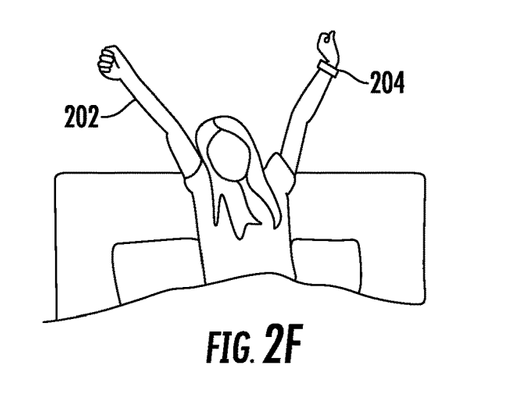

Referring to FIG. 2F, the system can detect, using the sensor(s) 124, data describing a subsequent user action performed after the haptic actuator produces the subsequent haptic output, compare the data describing the subsequent user action with the desired action to generate a subsequent effectiveness metric, and adjust the subsequent haptic output profile based on the effectiveness metric and the subsequent effectiveness metric.

The haptic system can be configured to repeat iterations including some or all of the steps described above until one or more criteria are satisfied. For example, the haptic output profile can be iteratively adjusted until the effectiveness metric satisfies one or more predetermined criteria. As examples, the effectiveness metric can include or describe target time intervals or target numbers of haptic output events required to elicit the desired user action, for example as described below. The effectiveness metric can include or describe other criteria. In some embodiments, the effectiveness metric may include or describe feedback data received by the user regarding the haptic output. For example, the user may indicate that the haptic output is too intrusive, alarming, repetitive, or otherwise undesirable, for example, by adjusting one or more user interface elements (e.g., sliders, dials, or the like) to indicate user feedback about various aspects of the haptic output. The predetermined criteria can be defined with respect to the various aspects of the effectiveness metric. For instance, the predetermined criteria can be or include a maximum time bound for a time interval range or the like.

The haptic system can detect the user response characteristic(s) using a variety of sensors 124, for example as described above with reference to FIG. 1A. In some embodiments, the user characteristic(s) detected by the haptic system can include one or more physiological response characteristics of the user. Example physiological response characteristics can include heart rate, skin temperature, blood pressure, and the like.

Figure 3A:
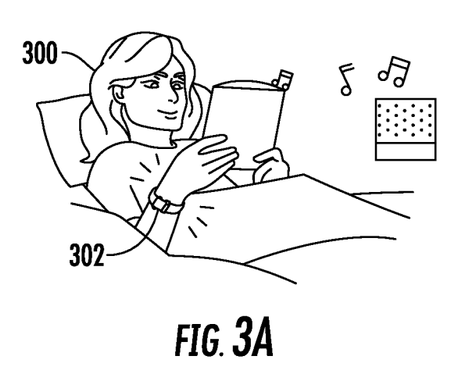
FIGS. 3A and 3B illustrate a series of sequential views of a user and a user device according to aspects of the present disclosure.

FIGS. 3A and 3B are a series of illustrations of another example according to aspects of the present disclosure. For example, referring to FIG. 3A, a haptic output can be produced by a user computing device 302, such as a wearable device, of a user 300.

Figure 3B:
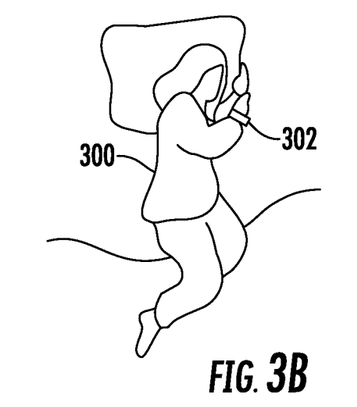

Referring to FIG. 3B, the user can perform an action, such as turning off a light, falling asleep, stopping reading, or the like. The system can evaluate the effectiveness of the haptic output at inducing the user 300 of the user computing device 302 to perform a desired action. In this example, the desired action can include turning off the light, falling asleep, stopping reading, or the like.

Figure 4A:
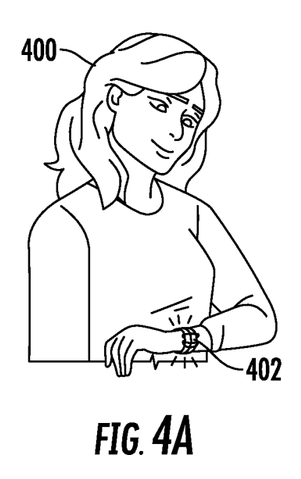
FIGS. 4A and 4B illustrate a series of sequential views of a user and a user device according to aspects of the present disclosure.
Figure 4B:
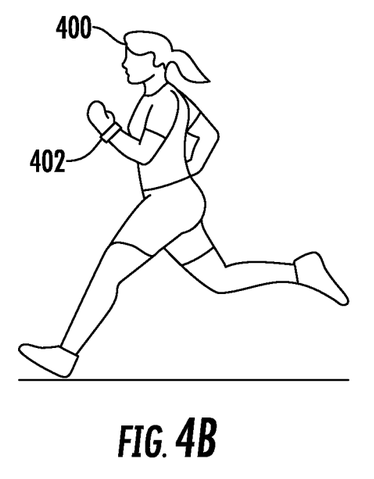

FIGS. 4A and 4B are a series of illustrations of another example according to aspects of the present disclosure. The haptic system can customize a haptic output to induce a user 400 to perform a desired action, such as exercising, such as running, jogging, sprinting, walking, or the like. As an additional example, the desired action can be altering an exercising pace, achieving a particular running pace or the like. For instance, a wearable user computing device 402 can be customized to prompt the user 400 to perform an exercise regimen. As an example, the exercise regimen can include a plurality of stages, such as running for a first time interval, jogging at for a second time interval, walking for a third time interval, running for a fourth time interval, and so forth. Respective exercising pace(s) or tempo(s) can be associated with some or all stages of the exercise regimen. Target actions can include achieving the respective exercising paces for one or more of the stages of the regimen. The computing system can detect data describing the user's pace, tempo, or the like, using a variety of sensors, such as accelerometers, global positioning system sensors, or the like.

Figure 5:
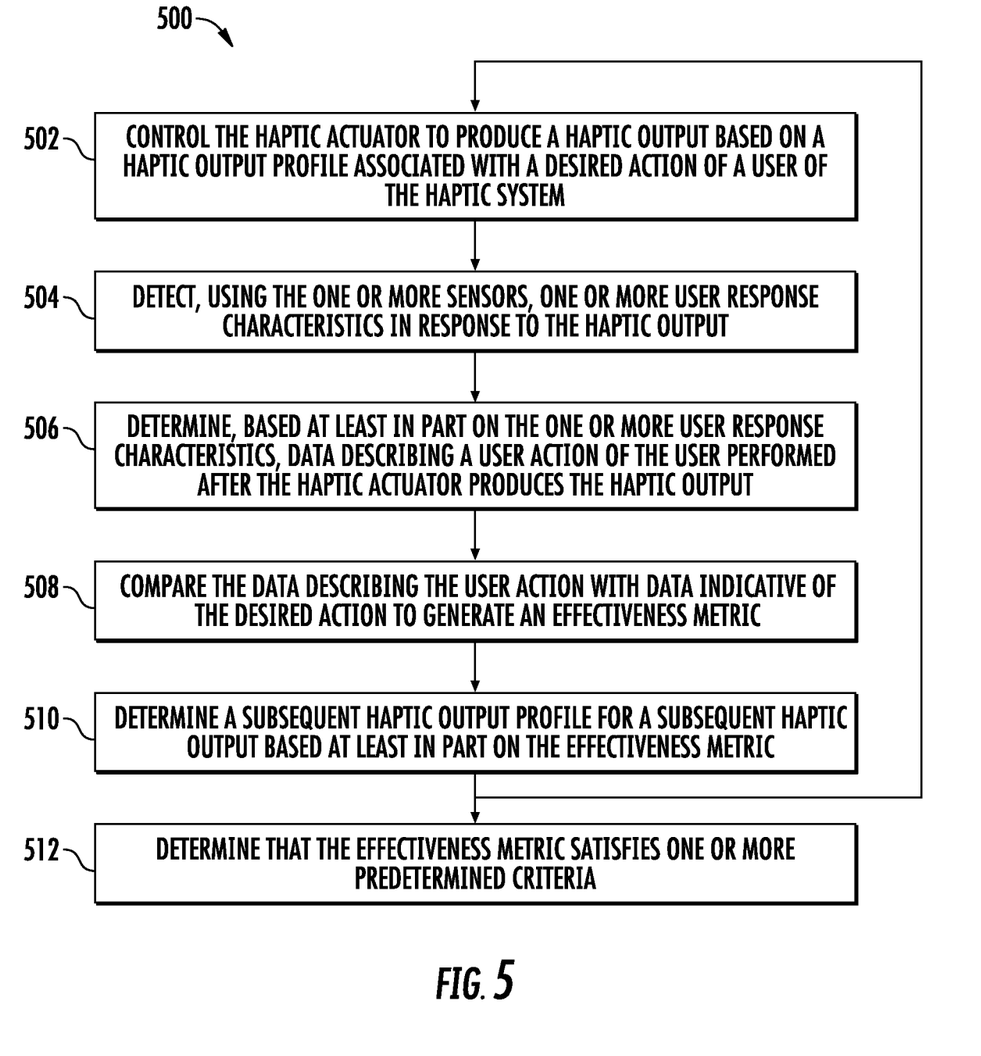
FIG. 5 illustrates a flow chart diagram of an example method for customizing a haptic output of a user device according to aspects of the present disclosure.

FIG. 5 depicts a flow chart diagram of an example method 500 for customizing a haptic output of a user device. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure. The steps of the method 500 can be performed by the haptic system 100 of FIG. 1A. However, any suitable system can be used.

At 502, the haptic system 100 can control the haptic actuator 126 of the user computing device 102 to produce a haptic output based on a haptic output profile associated with a desired action of a user of the user computing device 102. The desired action for the user can include a variety of actions. Examples include getting out of bed, turning on the light, taking a shower, starting to prepare dinner, taking a particular medicine, going for a run or walk, standing up to stretch, going to bed, reading a book, turning out the light, and going to sleep. Additional examples can include using the user device to perform an action such as setting an alarm, sending a text message, initiating a phone call, answering a phone call, starting to use a particular application, stopping using a particular application, and/or performing a particular action with a particular application.

At 504, the haptic system 100 can detect, using the sensor(s) 124, one or more user response characteristics in response to the haptic output. For example, an accelerometer can detect movement of the user. As another example, a heart rate sensor can detect an increase in the user's heart rate. Any of the sensors described herein can be used to detect an action or movement of the user.

In some embodiments, the haptic system 100 can collect information from multiple distinct sensors and/or sensor types and use this information when determining what user action is being performed. For example, the haptic system 100 can detect a first user response characteristic(s) using a first sensor and detect a second user response characteristic (e.g., movement) of the user using a second sensor. For instance, the haptic system 100 can detect user characteristics including an increased heart rate and/or increased skin temperature of the user using a heart rate sensor. The haptic system 100 can detect movement from the accelerometer that corresponds with jogging or running. The haptic system 100 can determine that the user is running based on this combination of information. Thus, in some embodiments, the haptic system 100 can determine or identify the user action based on signals received from multiple distinct sensors 124 and/or sensor types.

In some embodiments, the haptic system 100 can detect the user response characteristic(s) based at least in part from the user interacting with a touch-sensitive display screen (e.g., user input component 122) of the user computing device 102. For instance, the user can perform a particular action with the user device 102. The haptic system 100 can determine data describing this action including how long it took for the user to perform the action, how many haptic events were produced to induce the user to act and so forth.

In some embodiments, a haptic output produced by the haptic actuator may not induce the user to take an action that is suitably similar to the desired action (e.g., the user may not act at all or may act differently than desired. As one example, the desired user action could include getting out of bed. If the user does not get out of bed after the haptic output is produced, the haptic system 100 could repeat the haptic output until the user gets out of bed. For example, before detecting the data describing the user action by the user using the sensor(s) and after controlling the haptic actuator to produce the first haptic output based on the haptic output profile associated with the desired action, the haptic system 100 can control the haptic actuator to produce at least one subsequent haptic output.

The haptic system 100 can determine how many subsequent/repeated haptic output(s) were required to induce the user to perform the desired action or a similar action. For example, the data the user action and/or the comparison of the user action with the desired action can include a number of subsequent haptic output(s) produced before the user performed the desired action. As another example, the effectiveness metric can include the number of subsequent haptic output(s). A haptic output that required no subsequent/repeated haptic output events may result in an effectiveness metric indicative of greater effectiveness than a different haptic output that was repeated once or more before the user acted. Comparing the data describing the user action with the desired action to generate the effectiveness metric can include comparing the number of the subsequent haptic output(s) with a target number of haptic outputs, such as two haptic outputs or fewer. Thus, the haptic system 100 can iteratively adjust the haptic output profile to improve the effectiveness of haptic output at inducing the desired action with fewer repeated haptic output events.

At 506, the haptic system 100 can determine, based at least in part on the user response characteristic(s), data describing a user action of the user performed after the haptic actuator produces the haptic output. For example, the haptic system 100 can determine that the user has gotten out of bed, started walking and/or running, sat down or otherwise moved based on the accelerometer data and/or heart rate sensor data.

At 508, the haptic system 100 can compare the data describing the user action with the desired action to generate an effectiveness metric. The effectiveness metric can describe how effective the haptic output was at inducing the particular desired action. As examples, the effectiveness metric can quantify a similarity between the performed user action and the desired action, how long it takes for the user to perform the user action after the haptic output is produced, and/or how many times the haptic output is produced before the user performs the user action.

For example, the haptic system 100 can determine a time interval between controlling the haptic actuator to produce the haptic output (or the first haptic output if more than one haptic output is produced) and detecting that the user has performed the user action (e.g., to detect the data describing the user action using the sensor(s) of the user device). This time interval can be indicative of how effective the haptic output is at inducing the user action. Comparing the data describing the user action with data describing the desired action to generate the effectiveness metric can include comparing the time interval with a target time interval. The target time interval can include a maximum time bound. For instance, the maximum time bound can be two seconds, three seconds, or more. In this example, the haptic system 100 can iteratively adjust the haptic output profile to reduce the time interval below the maximum time bound. Thus, the haptic system 100 can improve the effectiveness of a haptic output at quickly inducing the desired action.

In some embodiments, the target time interval can include a minimum time bound in addition to the maximum time bound. The minimum time bound can prevent the haptic system 100 from adjusting the haptic output to where it is too urgent or annoying to the user. As one example, a target time interval for inducing a user to get out of bed can have a minimum time bound of 30 seconds, 60 seconds, 120 seconds or longer, such that the haptic system 100 does not iteratively arrive at a haptic output profile that is too alarming or urgent for the target user action. In addition, in some embodiments, the target time interval could include a minimum time bound and/or a maximum time bound.

In some embodiments, comparing the data describing the user action with the data indicative of the desired action to generate the effective metric can include determining one or more parameters of the user action with one or more parameters of the desired action. For example, the desired action can include increasing a tempo of an exercise (e.g., run, jumping jacks, or the like) that the user is performing to a target tempo. In this example, the comparison can include determining a difference between a current tempo of the exercise being performed by the user and the target tempo.

At 510, the haptic system 100 can determine a subsequent haptic output profile for a subsequent haptic output based at least in part on the effectiveness metric. In some embodiments, the haptic system 100 can employ one or more machine-learned models, for example as described below with reference to FIGS. 6A and 6B. The subsequent haptic output profile can be configured to more effectively induce the user to perform the desired action, for example based on the effectiveness metric.

In some embodiments, the haptic system 100 can iteratively adjust the haptic output profile. For instance, the haptic system 100 can iteratively repeat one or more of the steps 502-510 above. The haptic system 100 can iteratively repeat the steps 502-510 until the haptic system 100, at 512, determines that the effectiveness metric satisfies one or more predetermined criteria. The predetermined criteria can be defined with respect to the various aspects of the effectiveness metric. For instance, the predetermined criteria can be or include a maximum time bound for a time interval range, a maximum number of haptic events before the user performs the desired action.

In some embodiments, the predetermined criteria can be or describe a threshold similarity between the action performed by the user and the desired action. In the example described above regarding the target tempo of an exercise being performed by the user, the predetermined criteria can be or include a maximum difference between the current tempo and the target tempo.

Figure 6A:
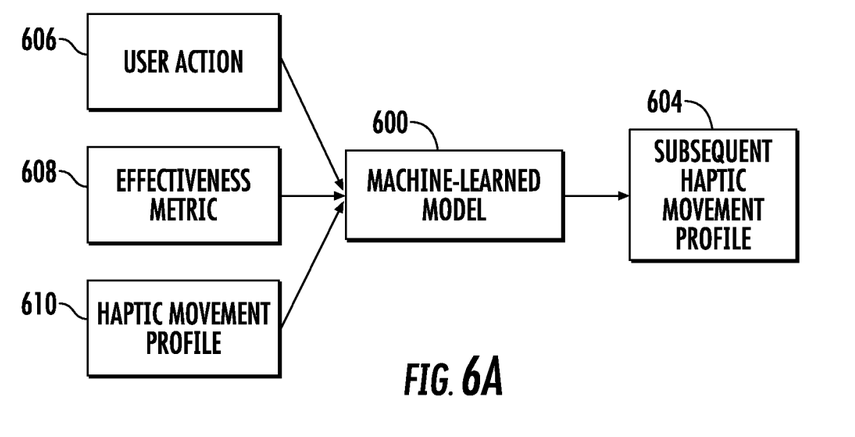
FIG. 6A illustrates a machine learned model configured to generate a subsequent haptic movement profile in response to receiving one or more inputs in accordance with example embodiments of the present disclosure.
Figure 6B:
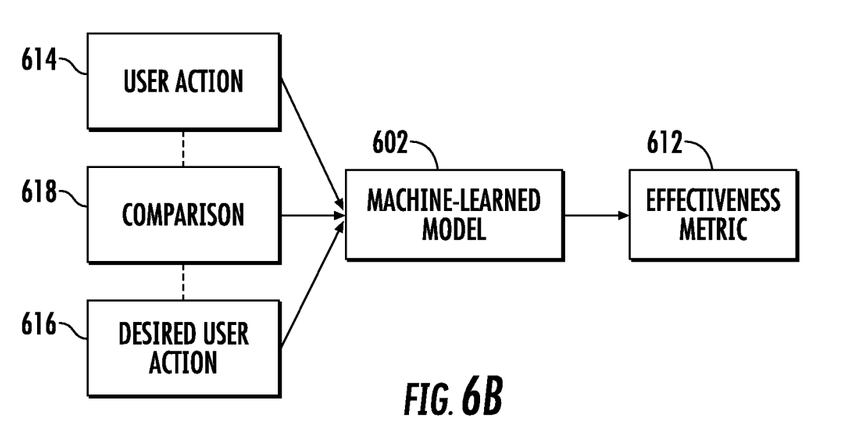
FIG. 6B illustrates a machine learned model configured to generate an effective metric in response to receiving one or more inputs in accordance with example embodiments of the present disclosure.

Referring to FIGS. 6A and 6B, in some embodiments, the haptic system 100 can include one or more machine-learned models 600, 602 configured to perform or assist with one or more of the determinations and/or steps described herein. The machine-learned models 600, 602 described herein can be or can otherwise include one or more various model(s) such as, for example, decision tree-based models (e.g., random forest models such as boosted random forest classifiers), neural networks (e.g., deep neural networks), or other multi-layer non-linear models. Neural networks can include recurrent neural networks (e.g., long short-term memory recurrent neural networks), feed-forward neural networks, convolutional neural networks, and/or other forms of neural networks.

Referring to FIG. 6A, in some embodiments, the machine-learned model 600 can be configured to generate data describing subsequent haptic output profile(s) 604. The machine-learned model 600 can receive, as input(s), data describing the user action 606, the effectiveness metric 608, and/or the haptic output profile 610. The machine-learned model 600 can be configured to output data describing the subsequent haptic output profile 604 for the subsequent haptic output. The machine-learned model 600 can be trained to generate data describing the subsequent haptic output profile(s) 604 to improve the effectiveness metric 608. Thus, in some embodiments, the haptic system 100 can leverage the machine-learned model 600 to iteratively adjust the haptic movement profile 610 to improve the effectiveness of the haptic output.

Referring to FIG. 6B, in some embodiments, the machine-learned model 602 can be configured to generate the effectiveness metric 612. The machine-learned model 602 can be configured to receive data describing the user action 614, the desired user action 616, and/or data describing a comparison 618 of the user action 614 with the desired user action 616. In response to receiving one or more of the input(s) 614, 616, 618, the machine-learned model 602 can output the data describing the effectiveness metric 612. Comparing the data describing the user action with the desired action to generate the effectiveness metric, at 508, can include inputting the data describing the user action 614, desired user action 616, and/or comparison with the desired action into the machine-learned model 602 and receiving data describing the effectiveness metric 612 as an output of the machine-learned model 602.

As another example, the haptic system can include a machine-learned model configured to determine a user action that is being performed by the user. The machine-learned model can be configured to receive sensory data from one or more sensors (e.g., the user response characteristics) and in response to receiving the user response characteristics, generate data describing the user action. The haptic system can determine the user action being performed using the machine-learned model by inputting the one or more user response characteristics into the machine-learned model and receive, as an output of the machine-learned model, the data describing the user action.

Figure 7:
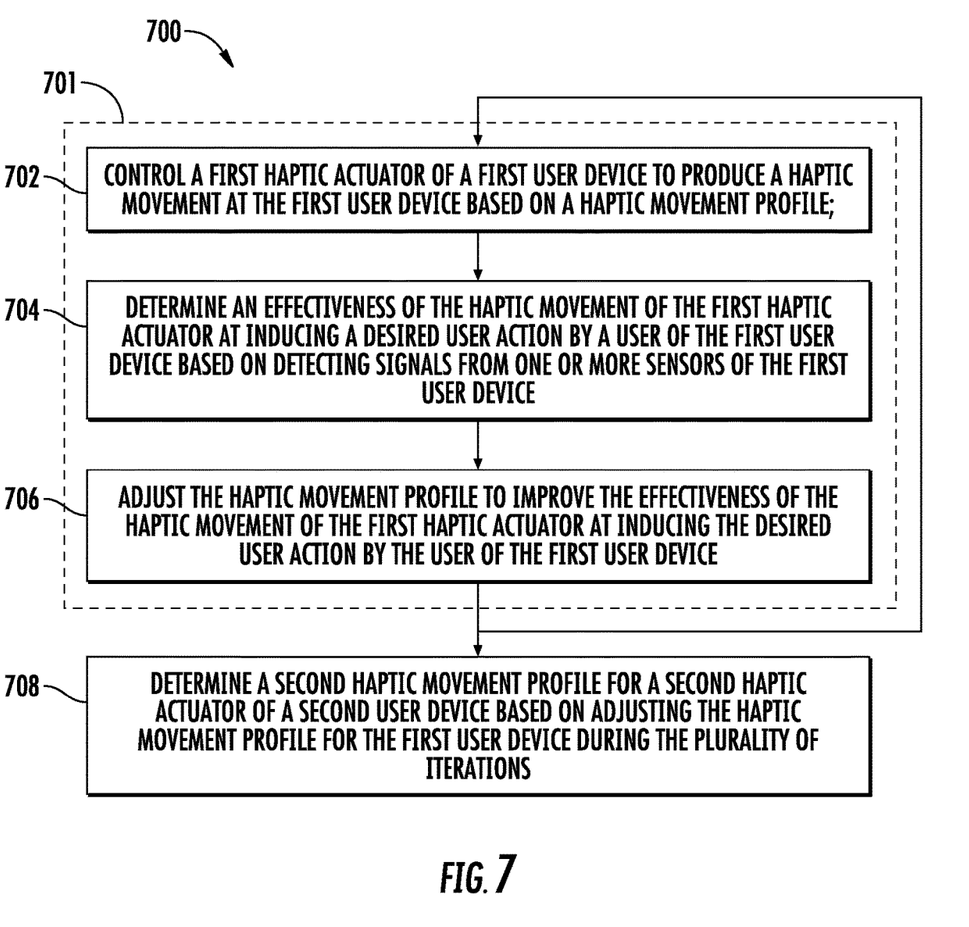
FIG. 7 illustrates a flowchart of a method for transferring or mapping a haptic output profile that has been customized on a first device from the first device to a second device according to aspects of the present disclosure.

FIG. 7 depicts a flow chart diagram of an example method 700 for transferring or mapping a haptic output profile that has been customized on a first device from the first device to a second device. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure. The steps of the method 700 can be performed by the haptic system 100 of FIG. 1A. However, any suitable system can be used.

During a plurality of operations 701, a haptic output profile can be iteratively adjusted on a first device, such as a smartwatch to increase or maximize the effectiveness of the haptic output to remind or cause the user to perform a particular action, such as checking on an item that is cooking in the stove within 1 minute of the haptic output being produced. After the plurality of operations 701, the haptic system 701 can map or transfer the haptic output profile to a second device such as a smartphone (e.g., of the same user). Aspects of the haptic output profile may be adjusted when being mapped or transferred from the first device to the second device based on a variety of factors. One example factor can include how the device is usually held, carried, worn, etc. For instance, smartphones are generally held in a pocket or handbag of the user instead of worn by the user, like a smartwatch. Another example factor can include physical properties (e.g., size, weight, etc.) of the devices and/or response characteristics of the actuators of the devices. For instance, a smartphone may have a smaller, less powerful actuator than a smartwatch. Smartphones may be larger than smartwatches and require larger haptic output at the actuator to create the same movement, force, vibration, etc. of the device and thus produce the same effect or a similar effect for the user. Thus, mapping or transferring customized haptic output profiles between devices can include adjusting the haptic output profiles to account for differences between the devices and/or the way the devices are used.

For example, referring to FIG. 7, the plurality of iterations 701 can include operations to customize the haptic output at the first device. The operations of the plurality of iterations 701 can include, at 702, controlling a first haptic actuator of a first user device to produce a haptic output at the first device based on a haptic output profile. The operations of the plurality of iterations 701 can include, at 704, determining an effectiveness of the haptic output of the first haptic actuator at inducing a desired user action by a user of the first user device. This determination can be made based on detecting signals from one or more sensors of the first user device. The operations can include, at 706, adjusting the haptic output profile to improve the effectiveness of the haptic output of the first haptic actuator at inducing the desired user action by the user of the first user device.

Next, after the plurality of iterations 701, the method 700 can include, at 708, determining a second haptic output profile for a second haptic actuator of a second user device. The second haptic output profile can be determined based on adjustments to the haptic output profile for the first user device during the plurality of iterations. For example, the second haptic output profile can be determined by mapping a haptic output for the first user device that has been suitably customized to produce the desired user action with desired parameters. For instance, the effectiveness of the haptic output profile can satisfy a predetermined satisfaction criteria threshold, such as inducing the desired user action within the time interval and/or explicitly being approved by the user for transfer between devices.

In some embodiments, data describing haptic output profiles from a group of users can be used to determine a suitable haptic output profile for a specific user. For example, the haptic system can personalize haptic output profiles for respective users of the group according to the method 500 of FIG. 5 or steps 702-706 of the method 700 of FIG. 7. Data describing the respective haptic output profiles can be collected and analyzed (e.g., by the server computing system 130 of FIG. 1A). Such analysis can be used to improve the haptic output profiles for individual users of the group of users. For example, the server computing system 130 could determine that the haptic output profiles for a first sub-group of users converges on a particular type of haptic output profile, yet the haptic output profiles for a second sub-group of the users converge on a different type of haptic output profile. In this example, the server computing system 130 could test the haptic output profile of the second sub-group of users on the first sub-group of users.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A haptic system comprising:
a user device comprising one or more haptic actuators and one or more sensors;
one or more processors; and
one or more memory devices, the one or more memory devices storing computer-readable instructions that when executed by the one or more processors cause the one or more processors to perform operations, the operations comprising, in an iteration:
controlling the one or more haptic actuators to produce a haptic output based on a haptic output profile associated with a desired action of a user of the haptic system;

detecting, using the one or more sensors, one or more physiological response characteristics of the user in response to the haptic output;
determining, based at least in part on the one or more physiological response characteristics, data describing a user action of the user performed after the one or more haptic actuators produces the haptic output;
comparing the data describing the user action with data indicative of the desired action to generate an effectiveness metric; and
determining a subsequent haptic output profile for a subsequent haptic output based at least in part on the effectiveness metric.

2. The haptic system of claim 1, wherein the operations further comprise, in an additional iteration:
controlling the one or more haptic actuators to produce the subsequent haptic output according to the subsequent haptic output profile;
detecting, using the one or more sensors, one or more subsequent user response characteristics in response to the subsequent haptic output;
determining, based at least in part on the one or more subsequent user response characteristics, data describing a subsequent user action of the user performed after the one or more haptic actuators produces the haptic output;
comparing the data describing the subsequent user action with the desired action to generate a subsequent effectiveness metric; and
adjusting the subsequent haptic output profile based on the effectiveness metric and the subsequent effective metric.

3. The haptic system of claim 1, wherein the operations further comprise iteratively adjusting the haptic output profile by performing a plurality of adjustment iterations until the effectiveness metric satisfies one or more predetermined criteria.

4. The haptic system of claim 1, wherein the physiological response characteristic of the user comprises at least one of a heart rate, a skin temperature, a blood pressure, or a skin galvanic response.

5. The haptic system of claim 1, wherein detecting, using the one or more sensors, one or more user response characteristics in response to the haptic output comprises detecting movement of the user device using an accelerometer of the one or more sensors.

6. The haptic system of claim 1, wherein determining, based at least in part on the one or more user response characteristics, the data describing the user action of the user comprises determining that the user is performing an action including at least one of walking, running, standing, sitting, sleeping, or laying down.

7. The haptic system of claim 1, wherein detecting, using the one or more sensors, one or more user response characteristics in response to the haptic output comprises detecting the one or more user response characteristics using a first sensor of the one or more sensors, and wherein the operations further comprise detecting, using a second sensor of the one or more sensors that is distinct from the first sensor, a movement of the user.

8. The haptic system of claim 7, wherein the first sensor comprises a physiological response sensor of the user device, and wherein the second sensor comprises an accelerometer of the user device.

9. The haptic system of claim 1, wherein detecting, using the one or more sensors, the one or more user response characteristics in response to the haptic output comprises detecting a user input action with a touch-sensitive sensor of the user device.

10. The haptic system of claim 1, wherein the operations further comprise, before detecting the data describing the desired user action using the one or more sensors and after controlling the one or more haptic actuators to produce the haptic output based on the haptic output profile associated with the desired action:
controlling the one or more haptic actuators to produce at least one subsequent haptic output.

11. The haptic system of claim 10, wherein:
detecting, using the one or more sensors, data describing the user action performed after the one or more haptic actuators produces the haptic output comprises determining a number of the at least one subsequent haptic output; and
comparing the data describing the user action with the desired action to generate the effectiveness metric comprises comparing the number of the at least one subsequent haptic output with a target number of haptic outputs.

12. The haptic system of claim 1, wherein detecting, using the one or more sensors, data describing the user action performed after the one or more haptic actuators produces the haptic output comprises determining a time interval associated with controlling the one or more haptic actuators to produce the haptic output and detecting the data describing the user action using the one or more sensors.

13. The haptic system of claim 12, wherein comparing the data describing the user action with the desired action to generate the effectiveness metric comprises comparing the time interval with a target time interval.

14. The haptic system of claim 1, wherein the one or more memory devices comprise one or more machine-learned models configured to receive, as an input, at least one of the data describing the user action, data describing the effectiveness metric, or data describing the haptic output profile and output the data describing the subsequent haptic output profile for the subsequent haptic output, and wherein determining the subsequent haptic output profile for the subsequent haptic output comprises:
inputting the at least one of the data describing the user action, data describing the effectiveness metric, or data describing the haptic output profile into the machine-learned model; and
receiving, as an output of the machine-learned model, the data describing the subsequent haptic output profile for the subsequent haptic output from the machine-learned model.

15. The haptic system of claim 1, wherein the one or more memory devices comprise a machine-learned model configured to receive data describing the user action, and in response to receiving the data describing the user action, output data describing the effectiveness metric, and wherein comparing the data describing the user action with the desired action to generate the effectiveness metric comprises:
inputting the data describing the user action into the machine-learned model; and
receiving data describing the effectiveness metric as an output of the machine-learned model.

16. The haptic system of claim 1, wherein the one or more memory devices comprise a machine-learned model configured to receive the one or more user response characteristics, and in response to receiving the one or more user response characteristics, generate the data describing the user action, and wherein determining, based at least in part on the one or more user response characteristics, the data describing the user action comprises:
inputting the one or more user response characteristics into the machine-learned model; and
receive, as an output of the machine-learned model, the data describing the user action.

17. The haptic system of claim 1, wherein the operations further comprise, after adjusting the subsequent haptic output profile based on the effectiveness metric and the subsequent effective metric, generating an additional haptic output profile for an additional user device that is distinct from the user device based on a comparison of characteristics of one or more haptic actuators of the additional user device with the one or more haptic actuators of the user device.

18. The haptic system of claim 1, wherein the one or more haptic actuators comprises a linear resonant actuator.

19. The haptic system of claim 1, wherein the one or more sensors comprise an accelerometer, and wherein the operations further comprise, while controlling the one or more haptic actuators to produce the haptic output;
detecting, using the accelerometer, a response profile of the user device in response to the one or more haptic actuators producing the haptic output; and
adjusting, the subsequent haptic output profile based on response profile of the user device.

20. The haptic system of claim 1, wherein operations further comprise:
determining one or more haptic output profile characteristics of the haptic output profile based on one or more design characteristics of at least one of the desired action or the user; and
generating the haptic output profile based on the one or more design characteristics.

21. The haptic system of claim 1, wherein the user device includes the one or more processors and the one or more memory devices.

22. A method for customizing a haptic output of a user device, the method comprising:
controlling, by one or more computing devices, one or more haptic actuators of a user device to produce a haptic output based on a haptic output profile associated with a desired action of a user of the user device;
detecting, by one or more computing devices and using the one or more sensors, one or more user response characteristics in response to the haptic output;
determining, by one or more computing devices and based at least in part on the one or more user response characteristics, data describing a user action of the user performed after the one or more haptic actuators produces the haptic output;
comparing, by one or more computing devices, the data describing the user action with data indicative of the desired action to generate an effectiveness metric; and
determining, by one or more computing devices, a subsequent haptic output profile for a subsequent haptic output based at least in part on the effectiveness metric; and
generating an additional haptic output profile for an additional user device that is distinct from the user device based on a comparison of characteristics of one or more haptic actuators of the additional user device with the one or more haptic actuators of the user device.

23. A haptic system comprising:
a user device comprising one or more haptic actuators and one or more sensors;
one or more processors; and
one or more memory devices, the one or more memory devices storing computer-readable instructions that when executed by the one or more processors cause the one or more processors to perform operations, the operations comprising, in an iteration:
controlling the one or more haptic actuators to produce a haptic output based on a haptic output profile associated with a desired action of a user of the haptic system;
detecting, using the one or more sensors, one or more user response characteristics of the user in response to the haptic output;
determining, based at least in part on the one or more user response characteristics, data describing a user action of the user performed after the one or more haptic actuators produces the haptic output;
comparing the data describing the user action with data indicative of the desired action to generate an effectiveness metric; and
determining a subsequent haptic output profile for a subsequent haptic output based at least in part on the effectiveness metric;
wherein the operations comprise, in an additional iteration:
controlling the one or more haptic actuators to produce the subsequent haptic output according to the subsequent haptic output profile;
detecting, using the one or more sensors, one or more subsequent user response characteristics in response to the subsequent haptic output;
determining, based at least in part on the one or more subsequent user response characteristics, data describing a subsequent user action of the user performed after the one or more haptic actuators produces the haptic output;
comparing the data describing the subsequent user action with the desired action to generate a subsequent effectiveness metric; and
adjusting the subsequent haptic output profile based on the effectiveness metric and the subsequent effective metric.

24. A haptic system comprising:
a user device comprising one or more haptic actuators and one or more sensors;
one or more processors; and
one or more memory devices, the one or more memory devices storing computer-readable instructions that when executed by the one or more processors cause the one or more processors to perform operations, the operations comprising, in an iteration:
controlling the one or more haptic actuators to produce a haptic output based on a haptic output profile associated with a desired action of a user of the haptic system;
detecting, using the one or more sensors, one or more user response characteristics of the user in response to the haptic output;
determining, based at least in part on the one or more user response characteristics, data describing a user action of the user performed after the one or more haptic actuators produces the haptic output;
comparing the data describing the user action with data indicative of the desired action to generate an effectiveness metric; and
determining a subsequent haptic output profile for a subsequent haptic output based at least in part on the effectiveness metric, wherein determining a subsequent haptic output profile for a subsequent haptic output comprises:
inputting at least one of the data describing the user action, data describing the effectiveness metric, or data describing the haptic output profile into the machine-learned model; and
receiving, as an output of the machine-learned model, the data describing the subsequent haptic output profile for the subsequent haptic output from the machine-learned model.

25. A haptic system comprising:
a user device comprising one or more haptic actuators and one or more sensors;
one or more processors; and
one or more memory devices, the one or more memory devices storing computer-readable instructions that when executed by the one or more processors cause the one or more processors to perform operations, the operations comprising, in an iteration:
controlling the one or more haptic actuators to produce a haptic output based on a haptic output profile associated with a desired action of a user of the haptic system;
detecting, using the one or more sensors, one or more user response characteristics of the user in response to the haptic output;
determining, based at least in part on the one or more user response characteristics, data describing a user action of the user performed after the one or more haptic actuators produces the haptic output;
comparing the data describing the user action with data indicative of the desired action to generate an effectiveness metric, wherein comparing the data describing the user action with data indicative of the desired action comprises:
inputting the data describing the user action into the machine-learned model; and
receiving data describing the effectiveness metric as an output of the machine-learned model; and
determining a subsequent haptic output profile for a subsequent haptic output based at least in part on the effectiveness metric.

26. A haptic system comprising:
a user device comprising one or more haptic actuators and one or more sensors;
one or more processors; and
one or more memory devices, the one or more memory devices storing computer-readable instructions that when executed by the one or more processors cause the one or more processors to perform operations, the operations comprising, in an iteration:
controlling the one or more haptic actuators to produce a haptic output based on a haptic output profile associated with a desired action of a user of the haptic system;
detecting, using the one or more sensors, one or more user response characteristics in response to the haptic output;
determining, based at least in part on the one or more user response characteristics, data describing a user action of the user performed after the one or more haptic actuators produces the haptic output, wherein determining, based at least in part on the one or more user response characteristics, the data describing the user action, comprises:
inputting the one or more user response characteristics into the machine-learned model; and
receiving, as an output of the machine-learned model, the data describing the user action;
comparing the data describing the user action with data indicative of the desired action to generate an effectiveness metric; and
determining a subsequent haptic output profile for a subsequent haptic output based at least in part on the effectiveness metric.

27. A haptic system comprising:
a user device comprising one or more haptic actuators and one or more sensors comprising an accelerometer;
one or more processors; and
one or more memory devices, the one or more memory devices storing computer-readable instructions that when executed by the one or more processors cause the one or more processors to perform operations, the operations comprising, in an iteration:
controlling the one or more haptic actuators to produce a haptic output based on a haptic output profile associated with a desired action of a user of the haptic system;
while controlling the one or more haptic actuators to produce the haptic output, detecting, using the accelerometer, a response profile of the user device in response to the one or more haptic actuators producing the haptic output;
detecting, using the one or more sensors, one or more user response characteristics of the user in response to the haptic output;
determining, based at least in part on the one or more user response characteristics, data describing a user action of the user performed after the one or more haptic actuators produces the haptic output;
comparing the data describing the user action with data indicative of the desired action to generate an effectiveness metric; and
determining a subsequent haptic output profile for a subsequent haptic output based at least in part on the effectiveness metric and the response profile of the user device.

* * * * *